United States Patent
Mussler et al.

[11] Patent Number: 5,924,257
[45] Date of Patent: Jul. 20, 1999

[54] COMPRESSION REPAIR PLUG

[75] Inventors: Gerald T. Mussler, Hilton; David A. Heeks, Rochester, both of N.Y.

[73] Assignee: Pfaudler, Inc., Rochester, N.Y.

[21] Appl. No.: 09/039,709

[22] Filed: Mar. 16, 1998

Related U.S. Application Data

[63] Continuation of application No. 07/836,770, Feb. 18, 1992, abandoned.

[51] Int. Cl.$^6$ .............................. E04G 23/02; B23P 6/04
[52] U.S. Cl. ..................... 52/514; 29/402.15; 52/741.4
[58] Field of Search .................................. 52/514, 741.4; 29/402.01, 402.02, 402.09, 402.12, 402.14, 402.15

[56] References Cited

U.S. PATENT DOCUMENTS

| | | | |
|---|---|---|---|
| 2,631,360 | 3/1953 | Sanford et al. | 29/402.15 |
| 2,917,819 | 12/1959 | Britton et al. | |
| 3,236,407 | 2/1966 | Zelman et al. | |
| 3,440,707 | 4/1969 | Warren et al. | |
| 4,078,697 | 3/1978 | Schlosberg et al. | 29/402.12 |
| 4,112,572 | 9/1978 | Schlosberg et al. | 29/402.15 |
| 4,161,689 | 7/1979 | Schlosberg et al. | |
| 4,497,418 | 2/1985 | Nunlist | 29/402.15 |
| 4,591,166 | 5/1986 | Atkinson et al. | |
| 4,826,181 | 5/1989 | Howard | 277/539 |
| 4,907,929 | 3/1990 | Johnston, Jr. | 411/431 |
| 4,948,319 | 8/1990 | Day et al. | 411/908 |

*Primary Examiner*—Michael Safavi
*Attorney, Agent, or Firm*—Michael L. Dunn

[57] ABSTRACT

A method and assembly for forming a compression seal about a stud in a base, for the purpose of effecting repairs in coatings over the base. The method comprises forming a compression seal about a stud in a base which comprises placing layers of a compressible sealing material on the base material about the stud. The layers are placed parallel to the base, and a relatively rigid material is placed over the compressible material so that the stud extends through both the compressible material and rigid material. The layers of the compressible material are compressed into sealing relationship by applying force to the rigid material in a direction against the base and only normal to the base; and securing and sealing the rigid material to the stud to maintain such compression, thus forming a seal to the base material about the stud. The assembly comprise a stud secured to said vessel wall and having a partially threaded portion inserted in the breach and a second portion exposed at said lining surface. A flexible and compacted packing material is disposed over said breach and about the surface of said exposed portion of said stud. A concave dome-shaped cap is mounted over said packing material and has a central aperture therein through which extends the free end of said exposed portion of said stud. A nut on said stud maintains pressure on said cap against said packing material to simultaneously squeeze the material into sealing position against both the exposed portion of said stud and the lining of said vessel on and about said breach. The improvement in the plug comprises using layers of packing material laid essentially parallel to the lining surface which are compacted into a fluid tight relationship by compression normal to the lining surface, without application of rotational force to said dome shaped cap about said stud.

8 Claims, 2 Drawing Sheets

COMPRESSION REPAIR PLUG

This application is a continuation of application Ser. No. 07/836,770, filed Feb. 18, 1992, now abandoned.

This invention relates to seals, especially for linings in vessels and more particularly relates to repair plug assemblies for vessels having corrosion resistant linings.

Repair plug assemblies for repairing defects such as breaches or holes in lined surfaces of a corrosion resistant glass or vitreous lined metal vessels are known in the art. As, for example, described in U.S. Pat. No. 4,497,418, such assemblies may include a stud affixed in the hole and having an exposed end over which is packed a flexible compactible sealing material which is contained in sealing position over the hole opening by means of a dome shaped disc which is compressed against the sealing material by tightening a nut on the shaft of the stud. Similar repair plugs are disclosed in U.S. Pat. Nos. 2,631,360; 2,917,819; 3,236,407; 3,440,707; 4,078,697; 4,112,572 and 4,161,689.

Unfortunately, all of the repair plugs described in the above patent have a similar disadvantage. In particular, the sealing material is sealed into place and compacted by threading some kind of compression nut onto a stud, either inside or outside of the vessel. This has significant disadvantages. In particular, compression is supplied by applying significant torque to threads on the stud. This may damage or strip them before the desired amount of compression is obtained. This is especially true when the stud is made of a corrosion resistant material, such as tantalum. Furthermore, when certain materials, such as graphite, were used as sealing materials, it was difficult to get a sufficient quantity of compression to obtain a reliable seal without damaging the stud or stud nut, regardless of the materials used in stud and nut.

Another serious disadvantage was that tightening a nut caused a rotational moment of force about the stud. This rotational moment created rotational forces in the sealing material which could adversely affect the quality of the seal. This was especially true when the nut was applied from inside the vessel where the nut directly contacted a dome or cap over the sealing material and tended to rotate it as the nut was tightened. Such rotation also tends to damage or score the dome covering over the sealing material. Such damage to the dome covering could be minimized and rotational effects could be somewhat reduced, though not entirely eliminated, by applying the nut from the outside of the vessel. This is, however, not desirable since it necessary to put a hole through the vessel wall, which tends to weaken the vessel and provide an open path to the exterior of the vessel in the case of seal failure.

BRIEF DESCRIPTION OF THE INVENTION

In accordance with the present invention, there is therefore provided a method and apparatus for forming a compression seal about a stud in a base, primarily for the purpose of effecting repairs in coatings over the base.

The method comprises forming a compression seal about a stud in a base which comprises placing layers of a compressible sealing material on the base material about the stud. The layers are placed parallel to the base, and a relatively rigid material is placed over the compressible material so that the stud extends through both the compressible material and rigid material. The layers of the compressible material are compressed into sealing relationship by applying force to the rigid material in a direction against the base and only normal to the base; and securing and sealing the rigid material to the stud to maintain such compression, thus forming a seal to the base material about the stud.

The apparatus comprises an improved repair plug assembly for repairing a breach in a lining of a corrosion resistant vessel wall. The assembly comprises:

a) a stud secured to said vessel wall and having a partially threaded portion inserted in the breach and a second portion exposed at said lining surface, b) a flexible and compacted packing material disposed over said breach and about the surface of said exposed portion of said stud, c) a concave dome-shaped cap mounted over said packing material and having a central aperture therein through which extends the free end of said exposed portion of said stud, and d) means on said stud maintaining pressure on said cap against said packing material to simultaneously squeeze the material into sealing position against both the exposed portion of said stud and the lining of said vessel on and about said breach. The improvement in the apparatus comprises using layers of packing material laid essentially parallel to the lining surface which are compacted into a fluid tight relationship by compression normal to the lining surface, without application of rotational force to said dome shaped cap about said stud.

DETAILED DESCRIPTION OF THE INVENTION

In accordance with the present invention, the layers of compressible material may be compressed in a direction only normal to the base, by any suitable means. The preferred method is by means of hydraulics. A preferred apparatus for accomplishing such compression is shown in FIG. 1.

Figure 1:
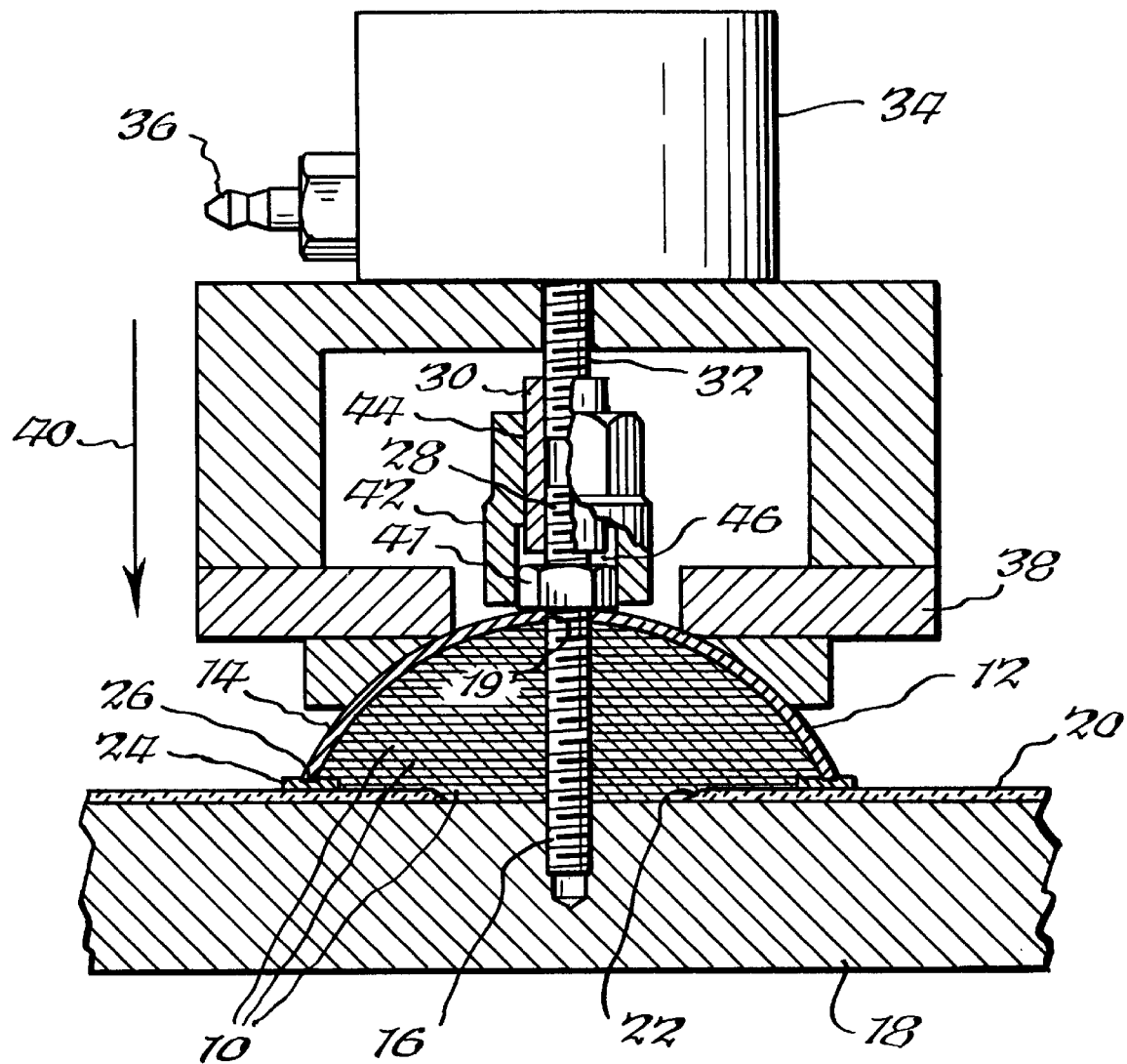
FIG. 1 is a cross-sectional view of a repair plug assembly of the invention showing an apparatus for applying compression normal to the base in accordance with the claimed invention.

As shown in FIG. 1, compressible material 10 is covered by relatively rigid material 12 in the form of dome shaped cap 14. Stud 16 is secured into base 18 by threading or welding and extends through the hole 19 in the top of dome shaped cap 14. Base 18 is covered by glass coating 20 which has an opening or breach 22 therein. A seal 24 is provided about lower edge 26 of dome shaped cap 14. Top end 28 of stud 16 is threaded into coupling 30 which is in turn threaded onto hydraulic piston 32 of hydraulic cylinder 34. Fitting 36 is provided to provide hydraulic fluid under pressure to cylinder 34 from a source not shown.

Attached to cylinder 34 is force plate 38 which applies pressure to dome shaped cap 14 in direction 40 when cylinder 34 is activated. Force plate 38 is contoured to mate with dome shaped cap 14 for even force distribution. Direction 40 is normal to base 18 and has no rotational component. The force moves dome shaped cap 14 in the direction of base 18 thus compressing compressible material 10 into a sealing relationship around stud 16 to seal opening 22 in a lining, e.g. glass coating 20. Another primary security seal is provided by pressure of lower edge 26 of dome shaped cap 14 against seal 24, which in turn forces seal 24 against glass coating 20.

In order to retain dome shaped cap 14 in the position which compresses compressible material 10 and seal 24, stud nut 41 is turned down on stud 16 until it contacts cap 14. Since primary compression is accomplished by means of hydraulic cylinder 34, nut 41 may be hand tightened; however, in a preferred embodiment, sliding wrench socket 42 is provided which has a base 44 which slides on coupling 30. Socket 42 has pocket 46 to mate with nut 41 such that a wrench may be engaged with socket 42 to turn nut 41. When such a wrench is used, minimum torque is applied to avoid rotational forces on dome shaped cap 14 and compressible material 10, and to avoid damaging cap 14, nut 41 or threads on stud 16.

After nut 41 is tightened to retain the relative positions of dome shaped cap 14 and base 18, hydraulic pressure may be released and coupling 30 may be removed. Cylinder 34 and face plate 38 may then be removed from the formed seal.

Figure 2:
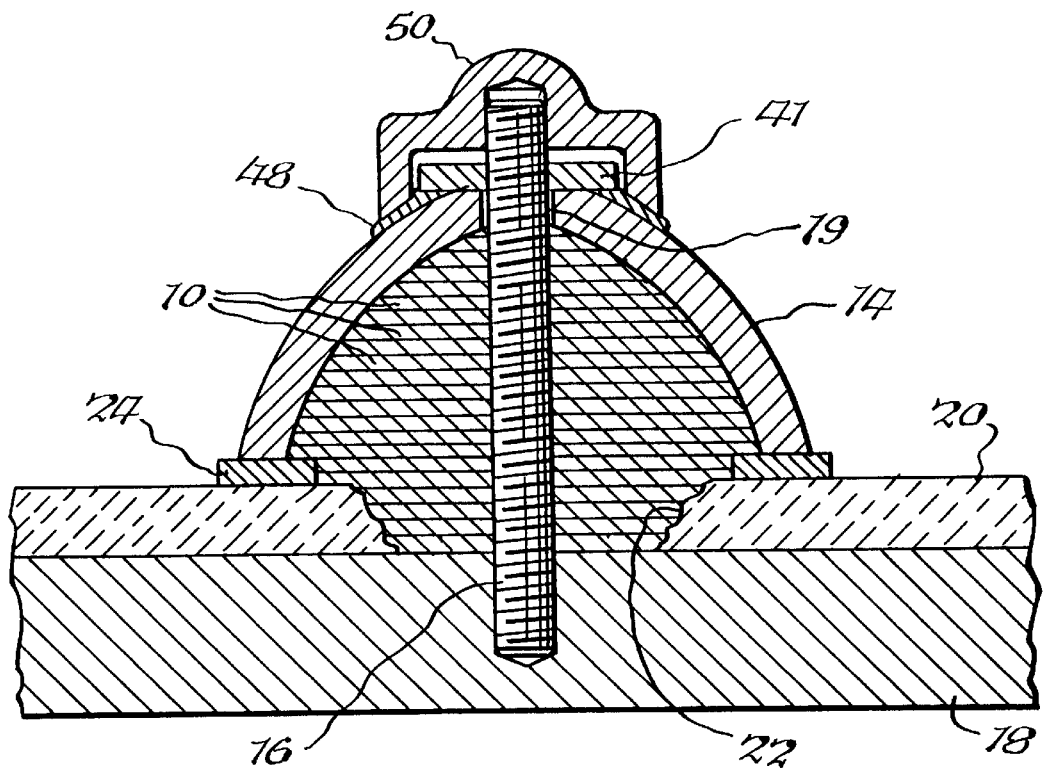
FIG. 2 is a cross-sectional view of a first embodiment of a repair plug of the invention.

As shown in FIG. 2, after the cylinder is removed, the stud may be capped with a dome shaped dome nut or acorn nut. Seal material such as polytetraflucroethylene may be used as a primary seal 24 and as a seal 48 between the dome nut and dome shaped cap (disc) 14. Such seal material acts as an electrical insulator, as does tantalum (TA) oxide which forms on tantalum in an oxidizing environment commonly found in chemical reactors. The use of polytetrafluoroethylene seal material thus permits the use of electronic fault finders to detect for imperfections which may occur in the glass lining.

Figure 3:
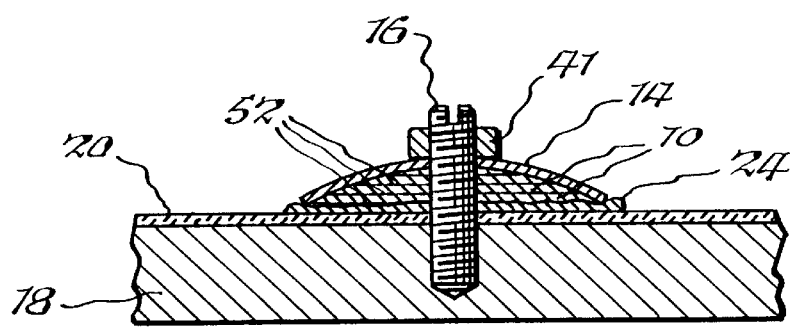
FIG. 3 is a cross-sectional view of a second embodiment of a repair plug of the invention.

FIG. 3 shows an alternative embodiment of a seal of the invention wherein the compressible material is primarily layers of polytetrafluoroethylene (PTFE).

Preferred seal materials for use as compressible sealing material are flexible graphite sheets (exfoliated graphite) and PTFE. the preferred metals for use as the rigid material, over the compressible material are tantalum and tungsten. The rigid material is usually a plate shaped as a disc or dome.

The force applied to the compressible material is the force required to form a reliable seal. Such force varies with the material used and is easily determined by one skilled in the art.

What is claimed is:

1. In an improved repair plug assembly attached to a vessel wall for repairing a breach in a corrosion resistant lining of said vessel wall wherein the assembly comprises:

a) a stud having a first portion secured to said vessel wall in the breach, without penetration of the wall, and a second portion of said stud exposed at said lining surface, b) a flexible and compacted packing material disposed over said breach and about the surface of said exposed portion of said stud, c) a concave dome shaped cap mounted over said packing material and having a central aperture therein through which extends the free end of said exposed portion of said stud, and d) means on said stud for maintaining compacting pressure on said cap against said packing material to simultaneously squeeze the material into sealing position against both the exposed portion of said stud and the lined surface of said vessel on and about said breach, wherein the improvement comprises compacted layers of packing material laid essentially parallel to the lining surface, which layers are compacted into a fluid tight relationship by compression normal to the lining surface, said compacted layers being free of rotational moments of force.

2. The repair plug of claim 1 wherein a seal washer is disposed between an edge at the base of the dome shaped cap and the lining to form a seal therebetween.

3. The repair plug of claim 1, wherein the dome shaped cap is retained by a stud nut on the stud and a dome nut covers said stud and stud nut.

4. The repair plug of claim 3 Wherein a cap seal is provided between the dome nut and the dome shaped cap to encapsulate the stud nut and stud within an area defined by the cap nut, cap seal and dome shaped cap.

5. The repair plug of claim 4 wherein the cap seal comprises polytetrafluoroethylene.

6. The repair plug of claim 5 wherein the packing material comprises exfoliated graphite.

7. The repair plug of claim 6 wherein the dome shaped cap and cap nut comprise tantalum.

8. The repair plug of claim 7 wherein the stud comprises tantalum.

\* \* \* \* \*